United States Patent
Panzram et al.

(10) Patent No.: US 8,840,065 B2
(45) Date of Patent: Sep. 23, 2014

(54) MULTIFUNCTIONAL CARGO HOLD SYSTEM

(75) Inventors: Uwe Panzram, Ganderkesee (DE); Hans-Joachim Schoen, Bremen (DE); Manfred Malarczuk, Lilienthal (DE); Thomas Grabow, Emtinghausen (DE)

(73) Assignee: Airbus Operations GmbH (DE)

( * ) Notice: Subject to any disclaimer, the term of this patent is extended or adjusted under 35 U.S.C. 154(b) by 490 days.

(21) Appl. No.: 13/124,484

(22) PCT Filed: Oct. 13, 2009

(86) PCT No.: PCT/EP2009/063335
§ 371 (c)(1),
(2), (4) Date: May 16, 2011

(87) PCT Pub. No.: WO2010/046276
PCT Pub. Date: Apr. 29, 2010

(65) Prior Publication Data
US 2011/0215198 A1    Sep. 8, 2011

Related U.S. Application Data

(60) Provisional application No. 61/196,747, filed on Oct. 20, 2008.

(30) Foreign Application Priority Data

Oct. 20, 2008  (DE) .................. 10 2008 052 337

(51) Int. Cl.
*B64C 1/20*    (2006.01)
*B64D 9/00*    (2006.01)
*B64D 11/04*    (2006.01)

(52) U.S. Cl.
CPC . *B64D 9/003* (2013.01); *B64C 1/20* (2013.01); *B64D 11/04* (2013.01)
USPC ........................... 244/118.1; 410/77

(58) Field of Classification Search
USPC .............. 244/118.1, 118.2, 118.5; 410/77
See application file for complete search history.

(56) References Cited

U.S. PATENT DOCUMENTS

| | | |
|---|---|---|
| 2,605,064 A | 7/1952 | Davis |
| 3,480,239 A | 11/1969 | Jensen et al. |
| 3,906,870 A | 9/1975 | Alberti |

(Continued)

FOREIGN PATENT DOCUMENTS

| | | |
|---|---|---|
| DE | 3432409 A1 | 3/1986 |
| DE | 43 36 801 C1 | 11/1994 |

(Continued)

*Primary Examiner* — Rob Swiatek
(74) *Attorney, Agent, or Firm* — Lerner, David, Littenberg, Krumholz & Mentlik, LLP

(57) ABSTRACT

A multifunctional cargo hold system for an aircraft includes a cargo hold floor; a retainer rail fitted to the cargo hold floor, suitable for the assembly of units for rolling and/or fixing of loaded elements. The units have a variable assembly with regard to the longitudinal direction of the retainer rail. The cargo hold system has a number of cargo positions, suitable for accommodating elements of the group, including a net for partitioning the cargo hold, a standard container, a palette, a telescopic system, an underfloor catering container, an underfloor rest space, a conveyor of fixed length and a conveyor of variable length, wherein each load position can accommodate at least four of the elements.

13 Claims, 10 Drawing Sheets

(56) References Cited

U.S. PATENT DOCUMENTS

| | | |
|---|---|---|
| 4,006,869 A | 2/1977 | Vogele |
| 4,234,278 A * | 11/1980 | Harshman et al. ............ 410/69 |
| 4,878,635 A * | 11/1989 | Nordstrom ................ 244/137.1 |
| 5,083,727 A | 1/1992 | Pompei et al. |
| 5,901,519 A * | 5/1999 | Wilson ...................... 52/506.01 |
| 6,193,453 B1 | 2/2001 | Kernkamp |
| 6,485,238 B2 * | 11/2002 | Segura ............................ 410/69 |
| 6,517,028 B2 * | 2/2003 | Huber ...................... 244/137.1 |
| 6,557,800 B2 * | 5/2003 | Medina et al. ............ 244/118.1 |
| 6,695,555 B2 | 2/2004 | Eilenstein et al. |
| 7,003,374 B2 * | 2/2006 | Olin et al. .................... 700/213 |
| 2008/0135681 A1 | 6/2008 | Hearing et al. |

FOREIGN PATENT DOCUMENTS

| | | |
|---|---|---|
| DE | 4411231 A1 | 11/1995 |
| DE | 19724941 A1 | 12/1998 |
| DE | 19961734 C1 | 3/2001 |
| DE | 10338704 A1 | 3/2005 |
| GB | 2287928 A | 10/1995 |
| GB | 2447503 A | 9/2008 |

* cited by examiner

MULTIFUNCTIONAL CARGO HOLD SYSTEM

REFERENCE TO RELATED APPLICATION

The present application is a national phase entry under 35 U.S.C. §371 of International Application No. PCT/EP2009/063335, filed Oct. 13, 2009, published in German, which claims the benefit of German Patent Application No. 10 2008 052 337.2, filed Oct. 20, 2008 and of U.S. Provisional Patent Application No. 61/196,747, filed Oct. 20, 2008, the entire disclosures of which applications are incorporated herein by reference.

FIELD OF THE INVENTION

The invention relates to a multifunctional cargo bay system for an aircraft, and an aircraft with such a cargo bay system.

TECHNOLOGICAL BACKGROUND

Cargo bays of aircraft are used in various configurations. While the primary function is here to stow luggage, cargo bays are also used to accommodate catering, break areas or waste. The most familiar configurations in this conjunction are standard containers or pallets ("cargo loading"), loads comprised of bulk mixed cargo ("bulk"), a telescope system ("telescopic bin"), a conveyor belt ("sliding carpet"), lower deck catering ("lower deck catering"), a lower deck lift ("lower deck lift") and lower deck facilities ("lower deck facilities"), such as beds, personnel break areas, waste containers, etc. The various arrangements for accommodating the corresponding configuration are made while manufacturing the aircraft. For example, DE 199 61 734 C1 discloses such a cargo bay system. The disadvantage here is that changes in the cargo bay configuration are complex and time intensive.

SUMMARY OF THE INVENTION

The object of the invention is to provide a cargo bay system for an aircraft that is easy to retrofit.

This object is achieved with a multifunctional cargo bay system according to the independent claim.

Advantageous further developments of the invention are the subject of the dependent claims.

One exemplary embodiment of the invention builds on the generic prior art with a multifunctional cargo system for an aircraft with a cargo bay floor; a retaining rail secured to the cargo bay floor, which is suitable for integrating means for rolling and/or fixing elements to be loaded, wherein the means are variably mountable in the longitudinal direction of the retaining rail, wherein the cargo bay system has a plurality of loading positions tailored to accommodate elements in the group, comprising: a net, a standard container, a pallet, a telescope system, a lower deck catering container, a lower deck break area, a fixed-length conveyor belt and variable-length conveyor belt, wherein a respective loading position is modified to accommodate at least four of the elements. The advantage to this is that the cargo bay of the aircraft can be flexibly tailored to the wishes of the aircraft purchaser or operator. Cargo bay system modification requests can be responded to quickly, with short lead times. In addition, such a cargo bay system makes it possible to increase the flexibility of the cargo bay system, thereby enabling the following loading systems at each location of the cargo bay: standard containers ("cargo loading"), loads comprised of bulk mixed cargo ("bulk"), a telescope system ("telescopic bin"), a conveyor belt ("sliding carpet"), lower deck catering ("lower deck catering"), a lower deck lift ("lower deck lift") and lower deck facilities ("lower deck facilities"), such as beds, personnel break areas, waste containers, etc. This makes it possible to realize a modular system with respect to the different possible ways in which the cargo bay system can be used. In addition, reconfigurations, conversions and retrofits can be implemented quickly as a result. In this conjunction, the loading positions for accommodating the mentioned elements being adjusted means that several or ideally all loading positions are provided with the electrical connections, terminals for connection to the electrical control system of the aircraft, and connections for water, fresh air, etc. required for several or ideally all of the elements, and that the aircraft floor can be tailored in a correspondingly flexible manner to all of these elements by means of detachable fixing and/or rolling units. As a consequence, the cargo bay can be adjusted and retrofitted to suit the wishes of the customer up until shortly before delivery, or ideally even during maintenance, without requiring larger-scale conversions, cable installations, etc. Previously, this required that a decision be made already during the structural assembly of the aircraft.

Let it also be noted at this juncture that the installation of the retaining rail on the cargo bay floor also includes the integration or embedding in the cargo bay floor. In addition, let it be noted that the elements to be loaded comprise at least one standard container, a pallet, a lower deck catering container and a lower deck break area, i.e., those elements from the group of elements to be accommodated that actually have to be rolled and fixed in place via the fixing/rolling units.

A respective loading position is preferably adjusted to accommodate at least five of the elements. It is even more preferred that a respective loading position be modified to accommodate at least six of the elements. It is even more preferred that a respective loading position be tailored to accommodate at least seven of the elements.

These advantages are ideally manifested in a multifunctional cargo bay system in which a respective loading position is modified to accommodate all elements.

In another exemplary embodiment of the invention, the retaining rail is a seat rail. Using a seat rail makes it possible to draw upon already present, tested components that are approved in aeronautical engineering. This permits a simple and rapid implementation in practice.

It is advantageously provided that the loading positions extend over at least 70 percent of the length of the cargo bay floor. The region just cited even more preferably encompasses 80 percent of the length of the cargo bay floor. This region even more preferably encompasses 90 percent of the length of the cargo bay floor, and the latter region even more preferably encompasses 95 percent of the length of the cargo bay floor. Providing all means necessary for installation purposes over this length makes it possible to achieve a maximum level of flexibility in equipping and retrofitting the cargo bay. No larger-scale conversions, cable installations or the like are required. This makes it possible to quickly respond to modifications requested by the customer, and the loading configuration can even be varied from flight to flight without any greater outlay, depending on what the aircraft is being used for. In this conjunction, the cargo bay system can offer a universal platform consisting of retaining rails, retaining points and arrangements (e.g., electrical cables, ductwork for cables, drainage lines), so as to enable the already mentioned loading configuration via quick-release fasteners (e.g., snap & click, plug & play, etc.).

In an exemplary embodiment, the advantages mentioned above can be achieved in a specific configuration by having all loading positions exhibit electrical plug connections for at least one of the elements.

Further, the advantages mentioned above can be achieved in another specific configuration of an exemplary embodiment by having all loading positions exhibit drainage pipes and/or drainage tubes for at least one of the elements In addition, the advantages mentioned above can be achieved in another specific configuration of an exemplary embodiment by having all loading positions exhibit a plug connection for hooking up at least one of the elements with a control computer integrated into an aircraft.

An advantageous exemplary embodiment provides that the cargo bay system is equipped with a rolling unit with at least one rolling cylinder, a quick-release fastener that can be detached without tools, with which the rolling unit can be detachably secured to a retaining rail of the cargo bay system. As a consequence, rolling units do not have to be provided at each location of the cargo bay floor, but rather only in the locations required for this purpose. In addition, this exemplary embodiment supports the advantages from the flexible retrofitting of the cargo bay.

These advantages can be realized even more effectively if the rolling unit also has a pivoting attachment hook. In addition, this results in an increased percentage of standardized components, and the expanded rolling unit serves as a uniform option for equipping the various loading configurations.

The same advantages can be achieved by equipping the cargo bay system with an attachment hook that can be secured to the retaining rail.

Exemplary embodiments of the invention will be described below with reference to the figures.

DETAILED DESCRIPTION OF AN EXEMPLARY EMBODIMENT

Figure 1:
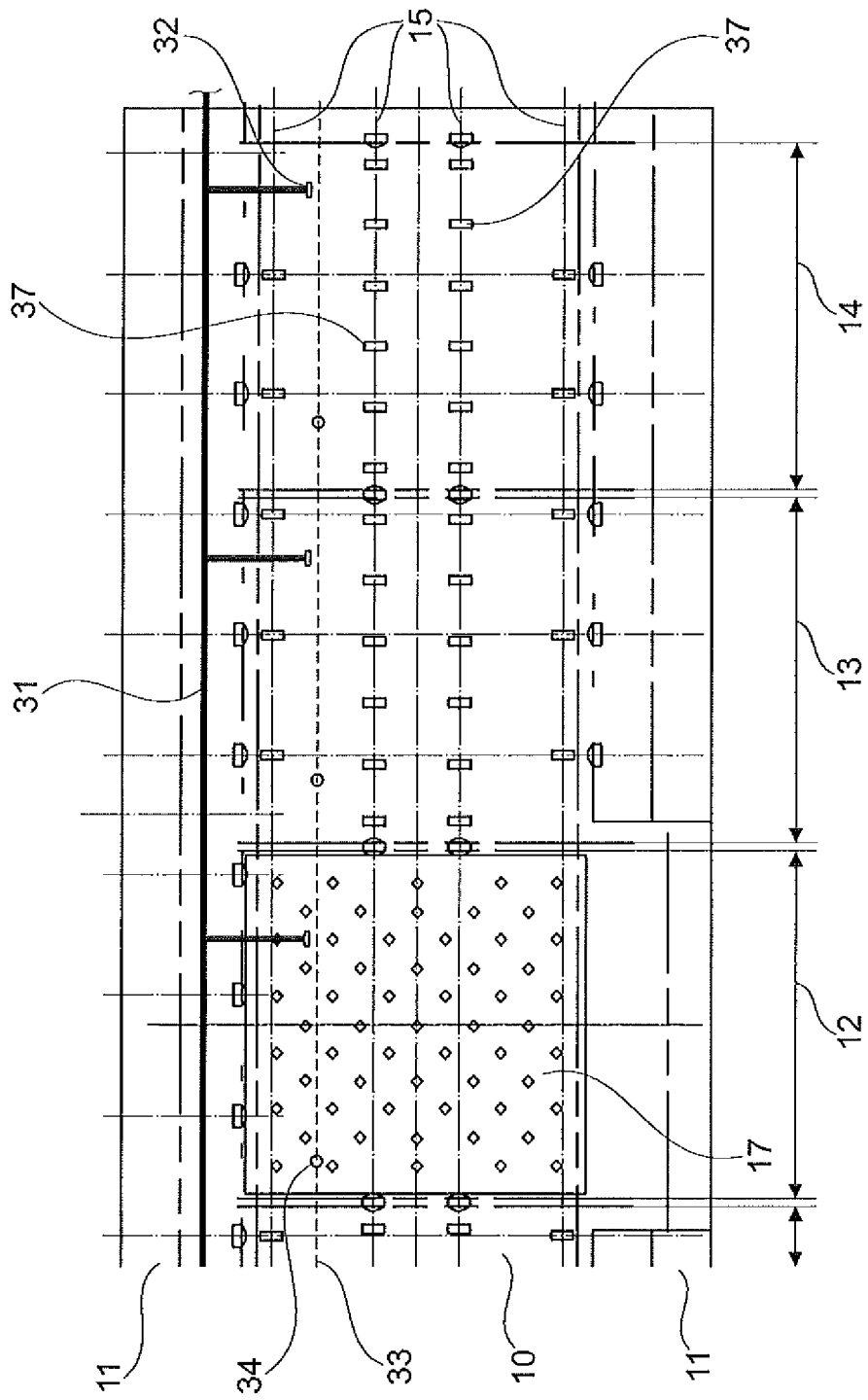
FIG. 1 shows the cargo bay system according to an exemplary embodiment of the invention.

FIG. 1 shows a cargo bay system according to an exemplary embodiment of the invention. In a sectionally depicted cargo bay involving a lower deck cargo bay, which shows the cargo bay floor 10 and cargo bay walls 11 proceeding at an upward incline from the latter, the cargo bay floor 10 is divided into various loading positions 12-14. Mounted on the cargo bay floor 10 and running in the longitudinal direction of the aircraft are retaining rails 15, which are preferably the kind of retaining rails also used for installing seats in the aircraft cabin, meaning commercially available seat rails. These retaining rails 15 are preferably embedded in the cargo bay floor 10, so that the upper side of the retaining rails 15 abuts flush with the cargo bay floor 10, but it is also conceivable that they be installed on the surface of the cargo bay floor 10 without being embedded. This exemplary embodiment provides four rows of retaining rails 15, wherein two rows run along the sides of the cargo bay floor 10, and the other two rows each are spaced roughly one third of the cargo bay floor width away from each side of the cargo bay floor 10, wherein the cargo bay floor width corresponds to the distance from one side of the cargo bay floor 10 to the opposite side of the cargo bay floor 10.

For example, the two centrally running rows of retaining rows 15 are provided with rolling units 37, which will be described in more detail later, and only two of which are labeled with a reference number on FIG. 1 for purposes of clarity. Alternatively or additionally, the other fixing/rolling units depicted in FIGS. 9 to 15 can also be provided. In practice, these fixing/rolling units are used in various combinations. These fixing/rolling units can be mounted at any location along the retaining rails 15, wherein the choice of mounting positions is naturally limited by the fact that the attachment means of the fixing/rolling units can only be used at specific latching positions of the retaining rails 15, and these latching positions are provided at a specific distance, for example two centimeters, along the longitudinal direction of the retaining rails 15.

As an alternative, only two or three, five, six or more retaining rails 15 may be provided. In addition, the fixing/rolling units may be mounted on only a few or all of these retaining rails 15.

Figure 2:
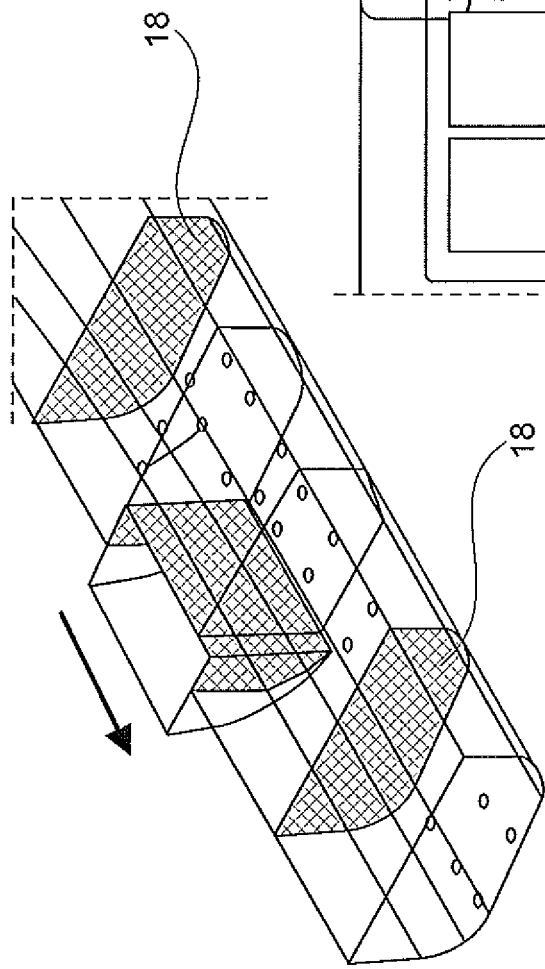
FIG. 2 shows the cargo bay system with nets.

For example, the two retaining rails 15 running along the sides of the cargo bay floor 10 in this exemplary embodiment are used for attaching the nets 18 mentioned in FIG. 2.

In the area of a cargo gate (not shown), i.e., in loading position 12, a ball plate 17 having a plurality of freely rotating balls is provided on the cargo bay floor 10. As a result, elements to be loaded that are transported into the cargo bay through the cargo gate can initially be pushed by hand into the cargo bay transverse to the longitudinal direction of the aircraft, and then either pushed further toward the front or back in the longitudinal direction of the aircraft up to the desired loading position 13, 14.

Reference number 31 denotes an electrical line that branches to each loading position 12-14, and is there connected with an electrical plug connection 32. Elements accommodated in the cargo bay that require a power can be hooked up to this plug connection, for example a telescope system, a lower deck lift system, a lower deck catering container, a lower deck break area, a fixed-length conveyor belt and a variable-length conveyor belt, wherein these elements will be described in greater detail later. In addition, the plug connections 32 can be hooked up with a lower deck cargo bay system for controlling the fixing/rolling units described later.

Further denoted with a dashed line is a drainage system 33, which can encompass drainage pipes and/or drainage tubes. This drainage system has drainage ports 34 in each loading position 12-14, which can be connected with elements accommodated in the cargo bay that require such a drainage port 34.

FIG. 2 shows the cargo bay system with nets 18, with which the cargo bay can be divided into separate areas. These nets are used when loading bulk mixed cargo into the cargo bay, and their lower side can be secured to the retaining rails 15 by means of fixing elements. The fixing elements are here designed in such a way that they can be quickly latched and unlatched in the retaining rails 15. In addition, the nets 18 can also be secured to the cargo bay walls 11 and cargo bay ceiling (not shown) via identical fixing elements. To this end, individual latching options or retaining points are provided at specific intervals, or the same retaining rails as on the cargo bay floor 10 are also provided along the cargo bay walls 11 and cargo bay ceiling.

The arrows on FIGS. 2 to 8 denote the longitudinal direction of the aircraft. The arrow here points in the direction of the aircraft nose.

Figure 3:
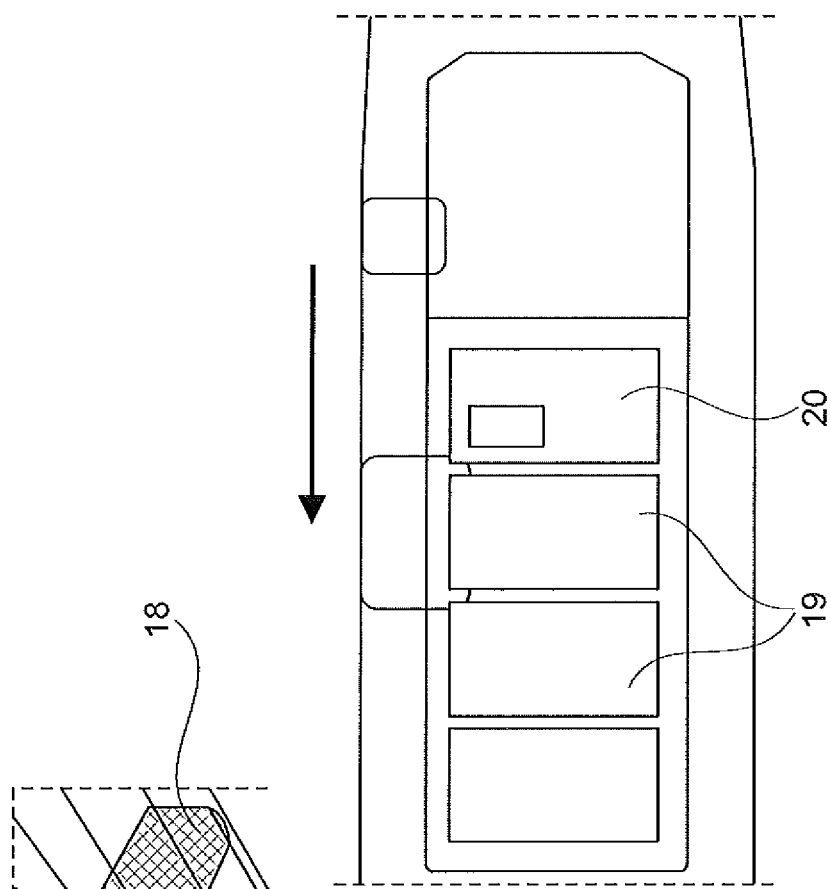
FIG. 3 shows the cargo bay system with standard containers and a lower deck break area.

FIG. 3 shows the cargo bay system with standard containers 19 and a lower deck break area 20. The lower deck break area 20 can have beds, for example, of which one bed is diagrammatically shown on FIG. 3. The standard containers 19 or lower deck break area 20 are rolled into the desired loading position 12-14 while loading the cargo bay on the rolling units, and secured in this position via the fixing function of the rolling units or fixing units described later. The functionality is the same when loading pallets, lower deck catering containers, and lower deck break areas.

Figure 4:
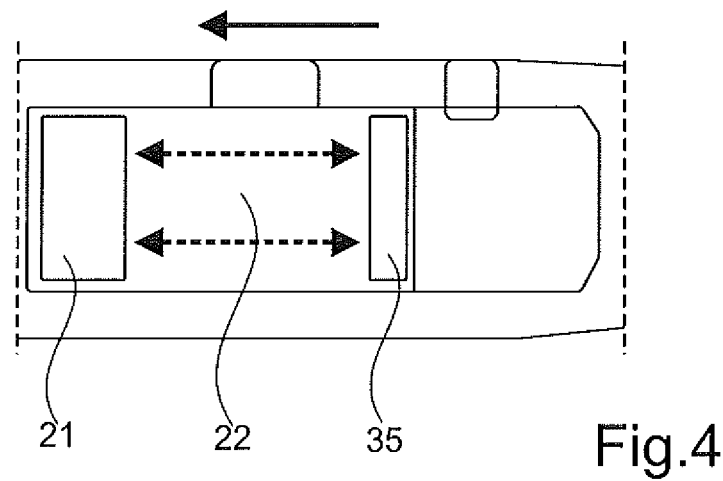
FIG. 4 shows the cargo bay system with a variable-length conveyor belt.

FIG. 4 shows the cargo bay system with a variable-length conveyor belt ("moveable bulkhead"). Reference number 21 denotes a roller container, which accommodates an unrolling conveyor belt 22. The conveyor belt 22 is here fixed to the roller container 21 on the one hand, runs toward the rear (directional indications relate to the longitudinal direction of aircraft), and is there looped around a deflection roller 35, which is secured in a fixed position on the cargo bay floor 10 or cargo bay walls 11, preferably by means of retaining rails 15, in such a way that the conveyor belt 22 runs back to the roller container 21, where it can be correspondingly rolled and unrolled on a roller (not shown).

The roller container 21 can move in the longitudinal direction by means of corresponding guides, wherein a forward motion increases the loadable surface of the conveyor belt 22 by also advancing the upwardly running conveyor band section between the roller container 21 and deflection roller 35, and the conveyor belt is repositioned out of the roller container 21 via the deflection roller. As a result, when the roller container 21 is in its rearmost position, the conveyor belt 22 can be loaded with baggage. As the loading process continues, the roller container 21 is then moved forward, and the conveyor belt is repositioned out of the roller container 21 via the deflection roller. This repositioned section of the conveyor belt 22 can now be loaded again until also full, so that the roller container 21 must be advanced further, etc.

Figure 5:
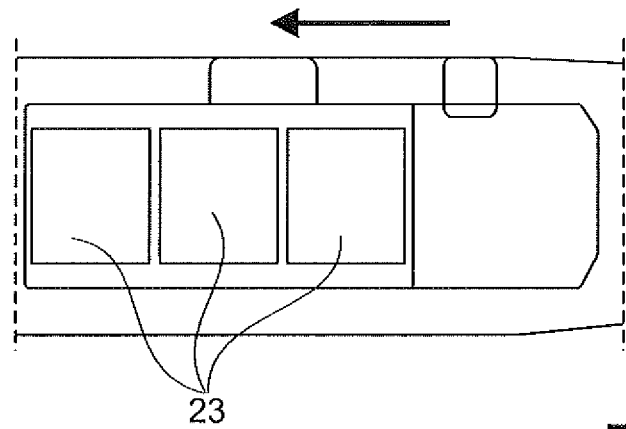
FIG. 5 shows the cargo bay system with pallets.

FIG. 5 shows the cargo bay system with pallets 23.

Figure 6:
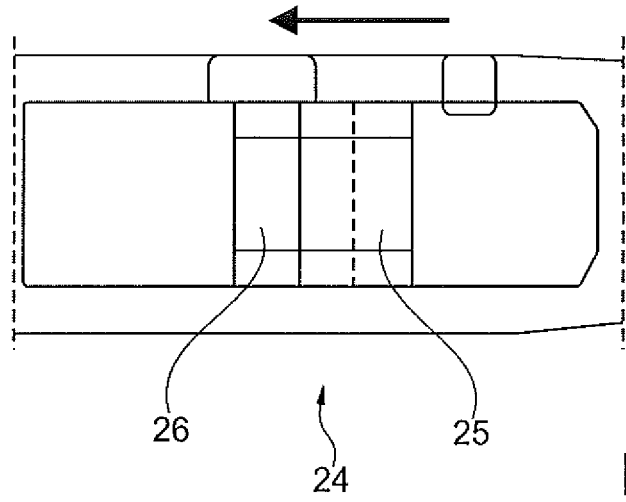
FIG. 6 shows the cargo bay system with a telescope system.

FIG. 6 shows the cargo bay system with a telescope system 24. The telescope system 24 essentially consists of two or more reciprocally shifting shells, so that a shell of variable size open at the top can be provided for loading with open, mixed cargo. FIG. 6 depicts a telescope system 24 with a shell 25 open to the top and rear, which is enveloped by a shell 26 also open to the top and rear. These shells 25 and 26 can be shifted relative to each other in the longitudinal direction of the aircraft to alter the volume of the telescope system 24, preferably by means of an electric drive.

Figure 7:
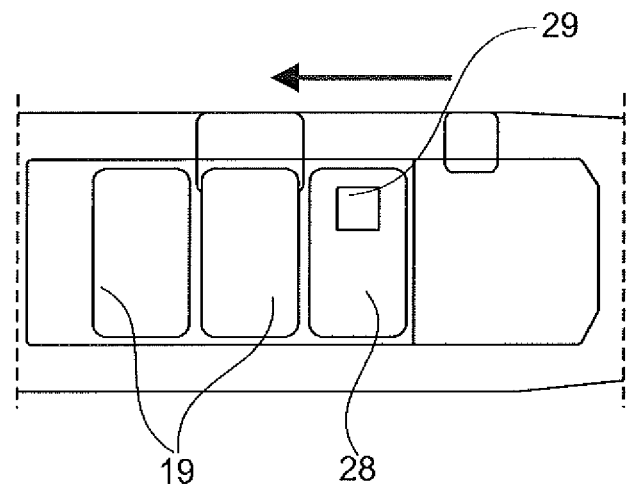
FIG. 7 shows the cargo bay system with standard containers and a lower deck catering container.

FIG. 7 shows the cargo bay system with standard containers 19 and a lower deck catering container 28. In the lower deck catering container 28, passenger catering items can be loaded into the cargo bay while loading the aircraft, and conveyed into the passenger area during flight by means of the lower deck lift system 29, for example which can also be configured for conveying trolleys.

Figure 8:
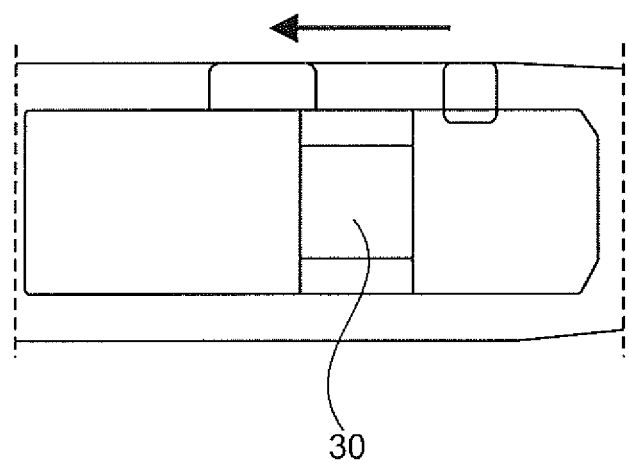
FIG. 8 shows the cargo bay system with a fixed-length conveyor belt.

FIG. 8 shows the cargo bay system with a fixed-length conveyor belt 30. The conveyor belt 30 is moved by an electric drive, and runs at least along the cargo bay floor 10, but can also run along the cargo bay walls 11 proceeding at an upward incline.

The following figures present examples of fixing/rolling units, which can be installed in the retaining rails 15.

Figure 9:
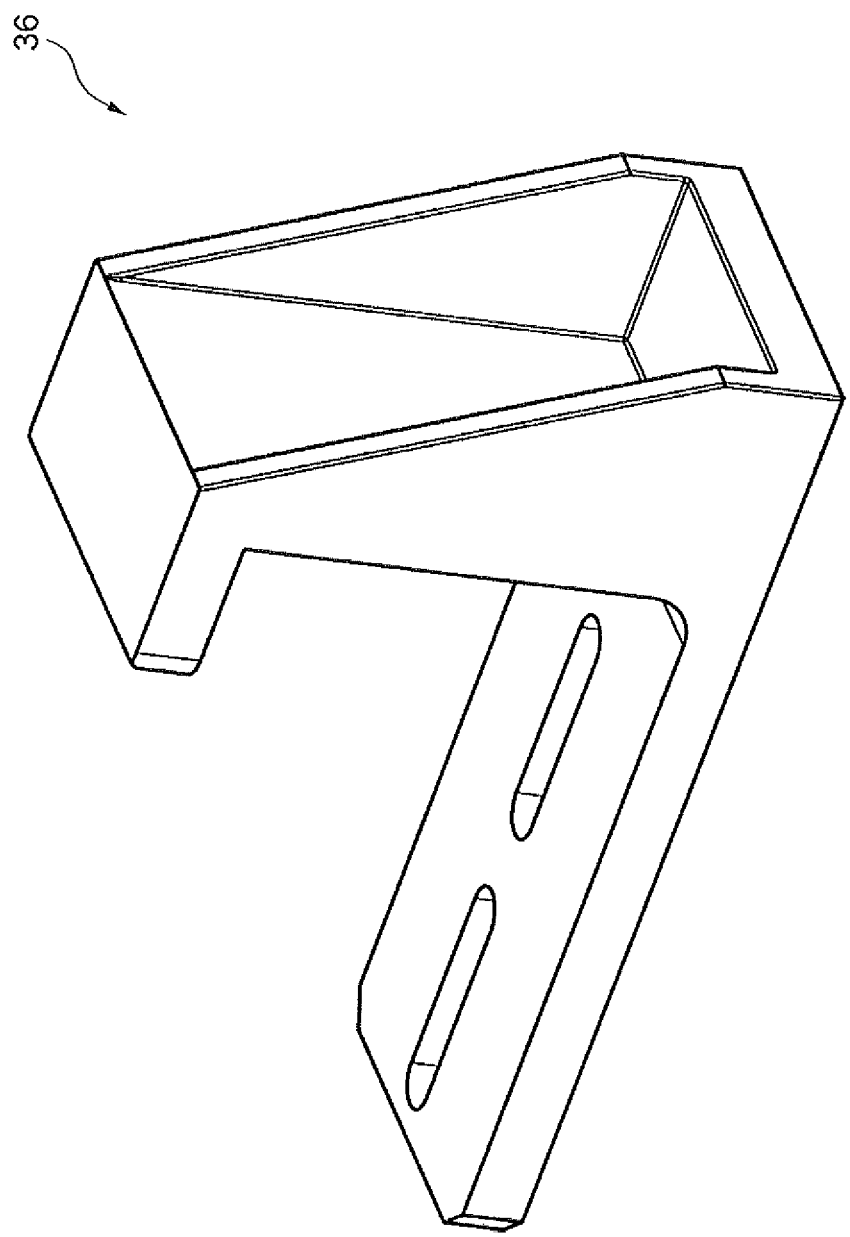
FIG. 9 shows a fixing unit.

FIG. 9 shows a fixing unit. This fixing unit 36 is designed as a hook, and has two oblong holes through which screws can be inserted to mount the fixing unit 36 to a retaining rail 15. The fixing unit 36 is used to fix the elements accommodated in the cargo bay, such as standard containers 19, pallets, 23, a telescope system 24, a lower deck lift system 28, lower deck catering containers 27, a lower deck break area 20, a conveyor belt 30, a conveyor belt 22, etc.

Figure 10:
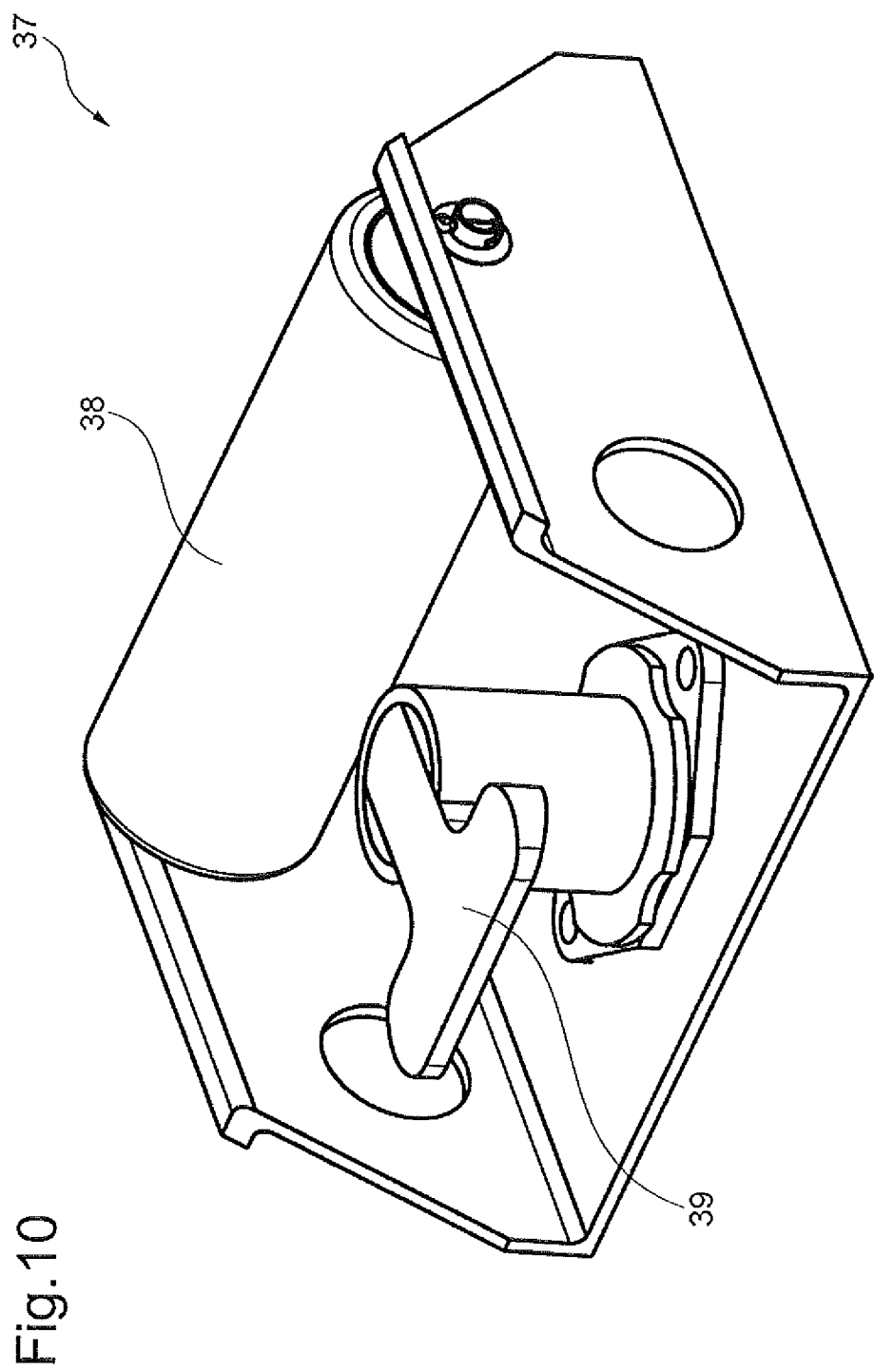
FIG. 10 shows a rolling unit.

FIG. 10 shows a rolling unit. This rolling unit 37 has a frame structure comprised of a floor plate and two lateral walls extending perpendicularly from the latter. It is provided that the rolling unit 37 can be mounted on the retaining rails 15, specifically in such a way that the longitudinal direction of the rolling unit 37 runs in the longitudinal direction of the retaining rails 15. The lateral walls carry a rolling cylinder 38, which runs perpendicularly to the longitudinal direction of the rolling unit 37, perpendicularly to the retaining rails 15, and hence perpendicularly to the longitudinal direction of the aircraft. A quick release fastener 39 is provided for purposes of attachment to the retaining rails 15. The quick release fasteners can here be any attachment means that make it possible to secure the rolling unit 37 on a retaining rail 15 using only the hands, i.e., without the use of tools. However, the quick release fastener 39 acts as follows. In the folded position depicted on FIG. 10, the rolling unit 37 is fixed in one of the retaining rails 15. For this purpose, the lower side of the rolling unit 37 is preferably furnished with a plate-like hook, which can be moved to a latching position (not shown) of the retaining rail 15 with the quick release fastener 39 (not shown on FIG. 10) in an unlatched state. By folding the quick release fastener 39 into the position shown on FIG. 10, the plate-like hook is moved in the direction of the floor plate of the rolling unit 37, and braced with projections of the retaining rail 15 having a smaller cross section than an opening at the latching position for threading the plate-like hook, so that the rolling unit 37 is held in this position as the result of bracing the hooks and projections. Swiveling the quick release fastener 39 by 90° in its unlatched position releases the fixation on the retaining rail 15, and the rolling unit 37 can be removed from the retaining rail 15.

Figure 11:
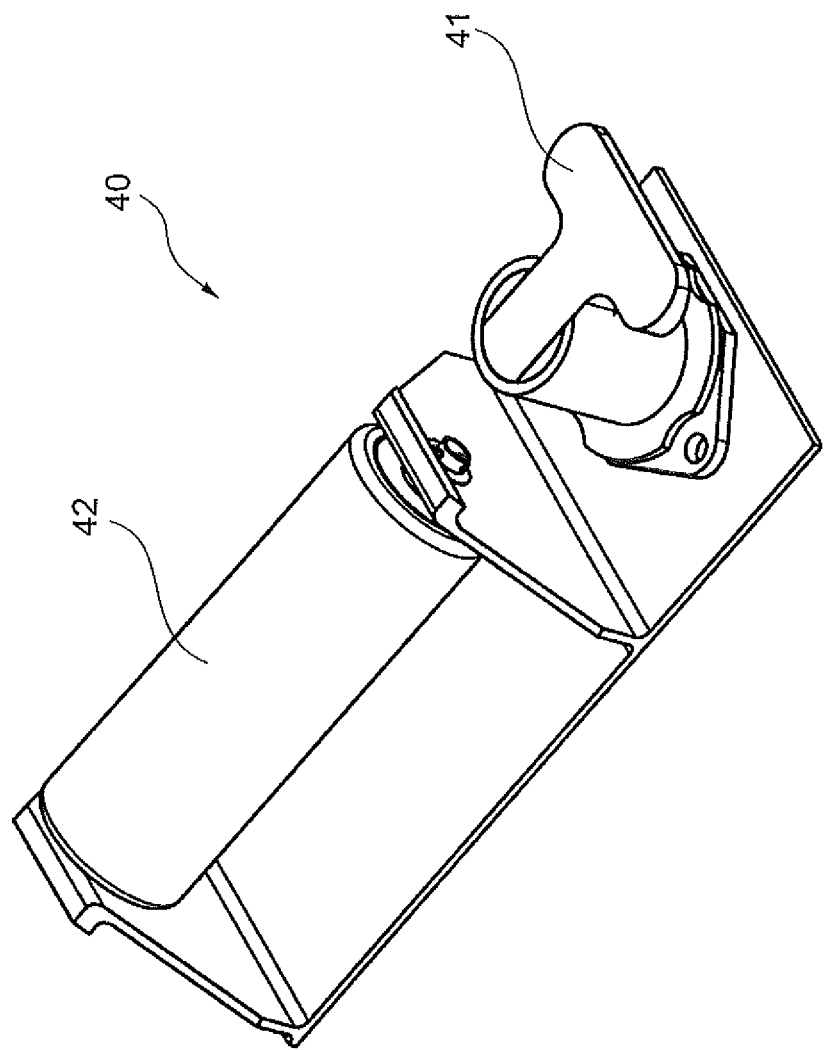
FIG. 11 shows another rolling unit.

FIG. 11 shows another rolling unit. The rolling unit 40 essentially differs from the one on FIG. 10 in that the quick release fastener 41 is arranged to the side of the rolling cylinder 42. As a result, the rolling cylinder 42 is not directly arranged over the retaining rail 15, but rather offset somewhat relative thereto.

Figure 12:
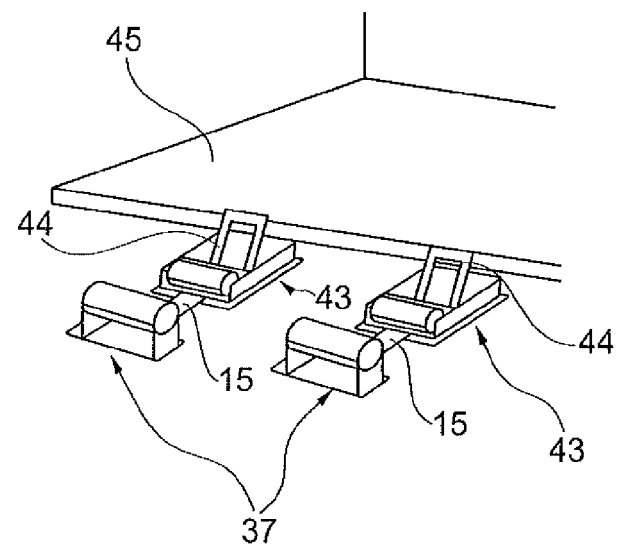
FIG. 12 shows another rolling unit with an additional fixing function.

FIG. 12 shows another rolling unit with an added fixing function. In addition to the one shown on FIG. 10, the rolling unit 43 has one more rolling cylinder and one more quick release fastener. Further, as an extra functionality relative to the one described in conjunction with FIG. 10, an attachment hook 44 is also provided in the center of the rolling unit 43. The attachment hook 44 can be pivoted, wherein the attachment hook can be pivoted in the direction of the retaining rail 15 (or floor plate) to a point where the end of the rolling cylinder spaced apart from the retaining rail 15 (or floor plate) is farther away from the retaining rail 15 than the end of the attachment hook 44 spaced apart from the retaining rail 15 in this swiveled position, and wherein the attachment hook 44 can be swiveled into a position in which the end of the attachment hook 44 spaced apart from the retaining rail 15 in this swiveled position is farther away from the retaining rail 15 than the end of the rolling cylinder spaced apart from the retaining rail 15.

Expressed differently, this means that the attachment hook 44 is embedded into the rolling unit 43 in the folded state in such a way that the elements to be loaded can roll on the rolling cylinders without the attachment hook 44 coming into contact with them in a disruptive fashion. This further means that, when folded out, the attachment hook projects over the rolling cylinder, thereby serving to fix standard containers 19, pallets 23, etc., for example. The floor plate of these elements to be loaded exhibits a web, the material thickness of which is such that it can envelop the attachment hook 44, so that the attachment hook fixes the element to be fixed in both the horizontal and vertical directions.

Figure 13:
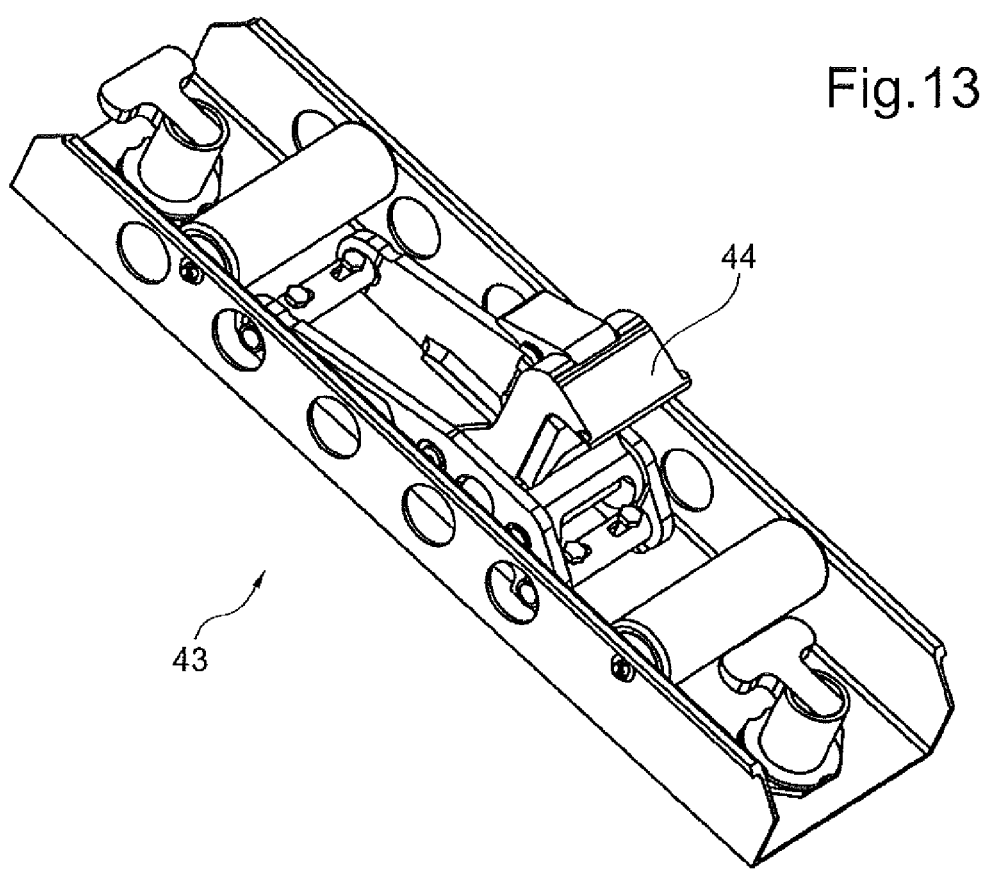
FIG. 13 shows the use of the rolling unit from FIG. 12 for fixing an intermediate floor.

FIG. 13 shows the use of the rolling unit from FIG. 12 for fixing an intermediate floor 45. This intermediate floor 45 can be provided to transport loose mixed cargo, while preventing the retaining rails, electrical plug connections 32 or drainage ports 34 from becoming contaminated or worn in the process.

Figure 14:
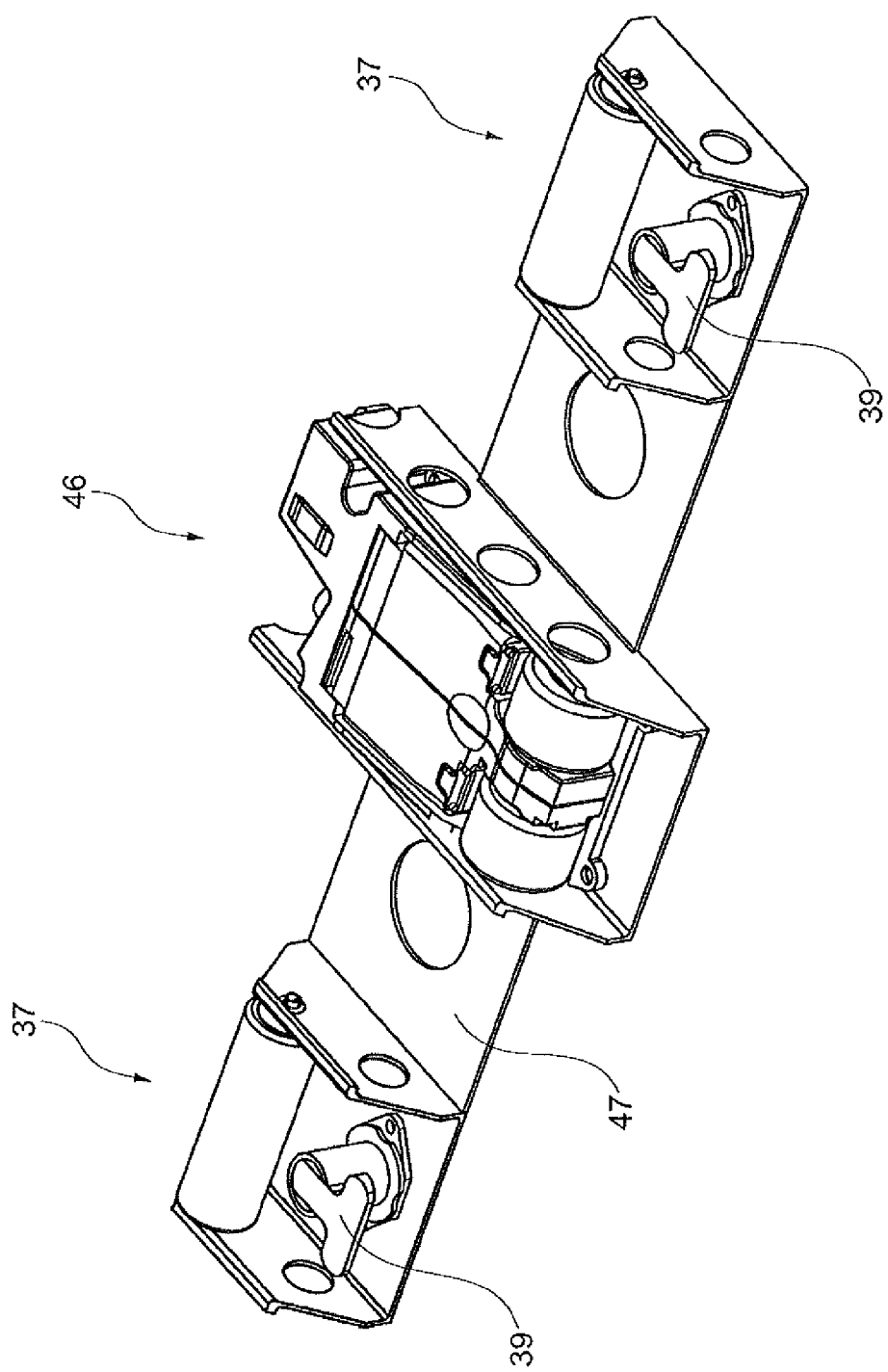
FIG. 14 shows a system of combined rolling units with drive.

FIG. 14 shows a system of combined rolling units with drive. In this system, two rolling units 37 and one rolling unit 46 are connected by means of a strap 47. The rolling unit 46 is a PDU ("power drive unit"), the rollers of which are rotated via an electric drive provided in the rolling unit 46. In this way, elements to be loaded (e.g., a standard container 19, a pallet 23, a lower deck catering container 27, a lower deck break area 20) can be electromechanically conveyed via the rolling unit 46. The complete system shown on FIG. 14 is here secured to two retaining rails 15 via the quick release fasteners 39.

Figure 15:
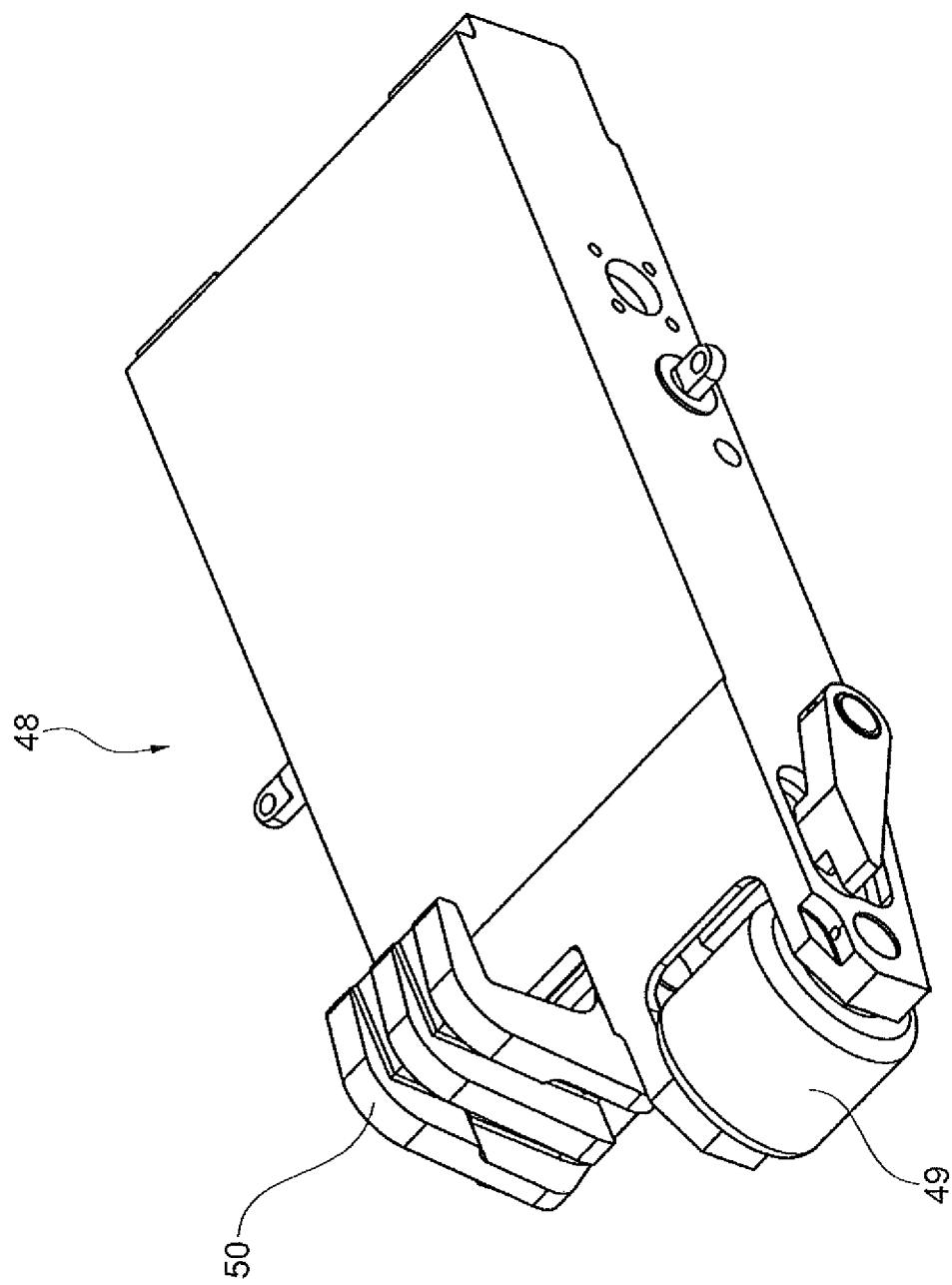
FIG. 15 shows a rolling unit with retaining bolt.

FIG. 15 shows a rolling unit with retaining bolt 50. This rolling unit 48 serves as an anti-rollout unit to prevent standard containers 19, for example, from unintentionally spontaneously rolling out of the cargo bay, e.g., when opening the cargo gate.

In addition, let it be noted that "comprising" and "exhibiting" do not preclude any other elements or steps, and that "an" or "a" do not rule out a plurality. Let it further be noted that features or steps described with a reference to one of the above further developments can also be used in combination with other features or steps of other further developments described above. Reference numbers in the claims are not to be construed as a limitation.

The invention claimed is:

1. A multifunctional cargo bay system for an aircraft, comprising:
    a cargo bay floor;
    a plurality of rolling means for rolling elements to be loaded, each of the rolling means comprising:
        a frame structure including a floor plate and first and second lateral walls extending perpendicularly from the floor plate; and
        a rolling cylinder extending between the first and second lateral walls such that at least a part of the rolling cylinder protrudes across a plane defined by free edges of the first and second lateral walls; and
    a retaining rail mounted on the cargo bay floor, wherein the retaining rail is configured for installing the rolling means;
    wherein each of the plurality of rolling means is variably mounted with respect to an adjacent rolling means along the longitudinal direction of the retaining rail;
    wherein the cargo bay system has a plurality of loading positions that are each adapted to accommodate at least four different elements selected from the group consisting of a net for dividing the cargo bay, a standard air cargo container, a pallet, a telescope system, a lower deck catering container, a lower deck break area, a fixed-length conveyor belt, a variable-length conveyor belt and a combination thereof.

2. The multifunctional cargo bay system of claim 1, wherein each loading position is adapted to accommodate at least six different elements selected from said group.

3. The multifunctional cargo bay system of claim 1, wherein each loading position is modified to accommodate all elements of said group.

4. The multifunctional cargo bay system of claim 1, wherein the retaining rail is a seat rail.

5. The multifunctional cargo bay system of claim 1, wherein the loading positions extend over at least 70 percent of the length of the cargo bay floor.

6. The multifunctional cargo bay system of claim 1, wherein all loading positions have electrical plug connections for at least one of the elements of said group.

7. The multifunctional cargo bay system of claim 1, wherein all loading positions have drainage pipes or drainage tubes for at least one of the elements of said group.

8. The multifunctional cargo bay system of claim 1, wherein all loading positions have a plug connection for hooking up at least one of the elements of said group with a control computer integrated into an aircraft.

9. The multifunctional cargo bay system of claim 1, further comprising a quick release fastener adapted to be detached without tools, the quick release fastener being adapted to detachably secure the rolling unit to the retaining rail of the cargo bay system.

10. The multifunctional cargo bay system of claim 9, wherein the rolling unit also has a swiveling attachment hook.

11. The multifunctional cargo bay system of claim 1, further comprising an attachment hook adapted to be secured to the retaining rail.

12. An aircraft comprising a cargo bay system, the cargo bay system comprising:
    a cargo bay floor;
    a plurality of rolling means for rolling elements to be loaded, each of the rolling means comprising:
        a frame structure including a floor plate and first and second lateral walls extending perpendicularly from the floor plate; and
        a rolling cylinder extending between the first and second lateral walls such that the rolling cylinder protrudes across a plane defined by free edges of the first and second lateral walls; and
    a retaining rail mounted on the cargo bay floor, wherein the retaining rail is suitable for installing the rolling means;
    wherein each of the plurality of rolling means is variably mounted with respect to an adjacent rolling means along a longitudinal direction of the retaining rail;
    wherein the cargo bay system has a plurality of loading positions that are each adapted to accommodate at least four different elements selected from the group consisting of a net for dividing the cargo bay, a standard air cargo container, a pallet, a telescope system, a lower deck catering container, a lower deck break area, a fixed-length conveyor belt, a variable-length conveyor belt and a combination thereof.

13. The multifunctional cargo bay system of claim 12, wherein each of plurality of rolling means comprises a quick release fastener configured to selectively secure and release the rolling means with respect to the retaining rail.

* * * * *